Sept. 17, 1957 W. L. HURFORD ET AL 2,806,978

ALIGNMENT OF TELEVISION CAMERA TUBES

Filed March 29, 1954

INVENTORS:
WINSLOW L. HURFORD,
EUGENE P. STANLEY,
BY Julius J. Zaskalicky
THEIR ATTORNEY 2,806,978

ALIGNMENT OF TELEVISION CAMERA TUBES

Winslow L. Hurford, Collingswood, N. J., and Eugene R. Stanley, Speedway, Ind., assignors to General Electric Company, a corporation of New York Application March 29, 1954, Serial No. 419,128

6 Claims. (Cl. 315—10)

Figure 1:
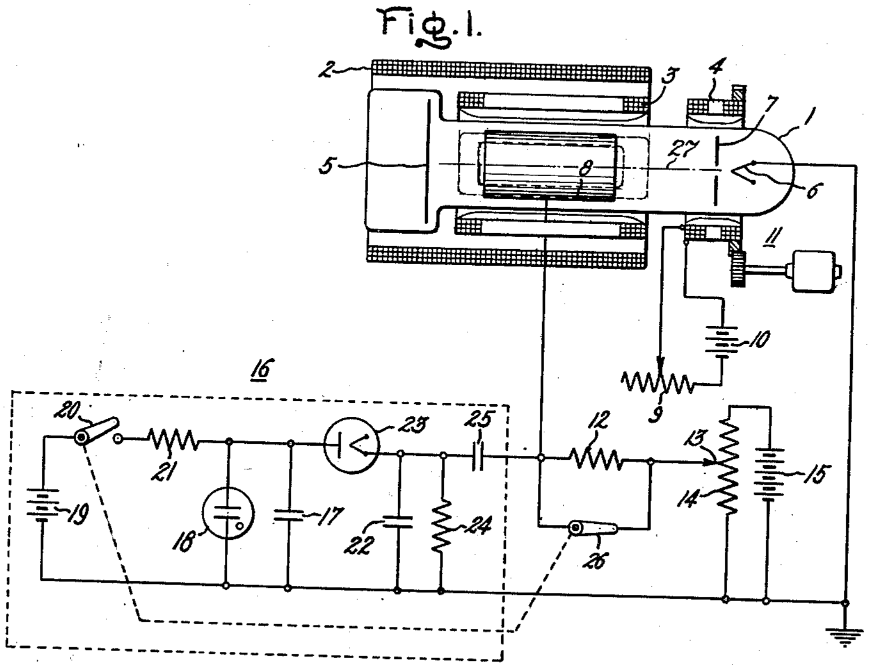
Figure 1:
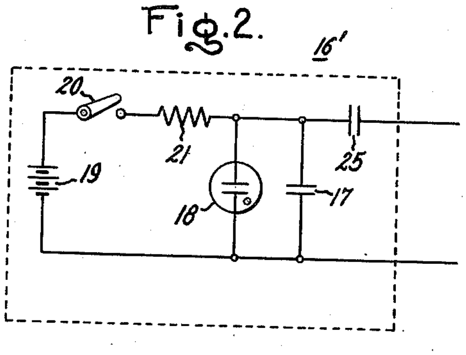

The present invention relates to television transmitters, and has an object thereof to provide improvements in the camera systems of such transmitters.

The present invention finds application in television camera systems employing camera tubes of the class including orthicon or image orthicon camera tubes. These camera tubes, in common with other types of camera tubes, employ a target upon which an electrical charge replica of a photographic image is formed, and an electron gun, which projects a narrow electron beam upon this target. The electron beam is caused to scan the charge replica in a regular pattern, and ultimately an image current is obtained whose instantaneous amplitude is approximately proportional to the charge density of the scanned points on the charge replica.

In camera tubes of the type to which the present invention is applicable, the electron beam is of relatively low velocity. The velocity is precisely adjusted with respect to a retarding electric field established between the electron gun and the target to cause the beam to stop just short of the target, unless the portion of the target then approached by the beam has a positive charge. Presence of a positive charge, locally overcomes the effect of the retarding field and attracts electrons from the beam, causing them to impinge on the target. The electrons in the beam, which are not so attracted then fall back through the electric field and are collected by an electrode surrounding the electron gun. This process has the effect of amplitude modulating the returning electron beam in accordance with the charge distribution on the charge replica, and is the mode of obtaining the image current.

A camera tube of this type is highly sensitive to misalignment of the electron gun, because of the large effect which gun alignment has on the beam velocity in the target region. In these camera tubes, the electron beam is focused by a magnetic field aligned coaxially with the path between the electron gun and the target. Entry of electrons into the focusing field at an angle thereto will cause them to describe helical paths, an effect which greatly reduces their forward velocity in the target region and thereby causes the return of electrons which otherwise would have impinged on the target to cause the modulation of the return electron beam. One ultimate effect of electron gun misalignment is to reduce the sensitivity of the camera tube, since the return beam is not as fully modulated as normally. Another effect is to cause loss of definition since the beam is effectively striking at an angle giving a reduced target area normal to the beam.

To prevent this diminution in sensitivity and loss of definition, special measures must be taken to adjust the electron beam orientation with great accuracy. Since the camera tube is a replaceable item in the transmitter and is not capable of uniform reproduction in respect to electron gun alignment, additional beam aligning means are usually provided in the camera tube assembly to correct the electron beam alignment. As a result, alignment of the electron beam is necessary whenever the picture tube is replaced and since the voltages or constants of the aligning means are also subject to change, alignment of the electron beam is a frequent operation.

The adjustment of the electron beam involves the manipulation of several inter-related controls and consequently is a time consuming task. The present invention is directed to an arrangement for simplifying the making of this adjustment.

Accordingly, it is another object of the present invention to provide an alignment system, suitable for use with camera tubes of the orthicon or image orthicon type, which simplifies the operation of aligning the electron beam produced by the electron gun thereof.

In carrying out the present invention in a television camera system having a camera tube of the type comprising a target electrode, an electron gun, and a focusing electrode, a focusing coil adapted to produce a magnetic field in a direction parallel to a line between the centers of said electron gun and said target electrode, an aligning coil adapted to produce a magnetic field perpendicular to said line, and energizing means for supplying current to said aligning coils, there is provided the novel combination comprising means for adjusting the orientation of said aligning coil, means for controlling the amount of current supplied to said aligning coil, a source of energizing potentials including means for producing a slowly varying periodic voltage, and switching means for selectively applying said periodic voltage to said focusing electrode during manipulation of said adjusting means and said controlling means.

The novel features which are believed to be characteristic of the invention are set forth with particularity in the appended claims. The invention itself, however, both as to its organization and method of operation, together with further objects and advantages thereof may best be understood by reference to the following description taken in connection with the accompanying drawings in which:

Figure 1 is a schematic diagram of an alignment system illustrating one embodiment of the present invention; and Figure 2 is a schematic diagram of a modification of the embodiment of Figure 1.

Referring now to Figure 1, there is shown in modified schematic diagram, an arrangement for aligning the electron beam of a television camera tube, the drawing illustrating only those portions of the television transmitter most directly associated with the present invention.

The television camera tube is shown at 1, mounted at the center of the cylindrically shaped focusing coil 2, and immediately surrounded by the horizontal and vertical deflecting coils 3, also within the focusing coil 2. Encircling the camera tube but mounted on a portion thereof extending beyond the focusing coil 2 is an alignment coil 4. The camera tube is provided with a target electrode 5 adapted to present an electric charge replica of the image to a narrow electron beam projected by the electron gun 6, further focused by the cylindrical electrode 8 and accelerated under the influence of a relatively small potential difference between the electron gun and the target, the source of this potential not being shown. The electron beam is caused to scan the target 5 under the influence of current flowing in the horizontal and vertical deflecting coils 3, which are connected to suitable sources of scanning potentials, not shown. The accelerating potential for the electron beam is such that when the electrons reach an uncharged portion of the target, they come to a halt and return to a collecting electrode 7 surrounding the electron gun. When the electron beam approaches a portion of the target bearing a positive charge, corresponding to a bright potrtion of the image, certain of the electrons in the beam are attracted to the target and the return beam is in effect amplitude modulated in accordance with the charge density at that portion. Suitable external connections, not shown, are provided between the return beam collecting electrode 7 and the electron gun 6 for transferring the video modulation so obtained to the subsequent portions of the transmitter.

Misalignment of the low velocity electron beam with respect to the line of centers shown at 27 between the electron gun and the target electrode is corrected by the aligning coil 4, connected through a variable resistance 9 to a source 10 of direct current. Means, not shown, are provided for adjustably positioning the alignment coil 4 along the axis of the camera tube. The aligning coil is also provided with means symbolically represented at 11 for rotation thereof about an axis parallel to the longer dimension of the camera tube. The aligning coil 4 provides a magnetic field transverse to the axis of the camera tube whose magnitude may be controlled by the variable resistance 9 and whose orientation may be controlled by the aligning means 11. These controls provide substantially complete correction for the electron gun misalignment.

In order to provide a readily observable indication of the condition of alignment of the electron beam, and thereby facilitate rapid adjustment of the alignment controls, a novel energizing circuit is provided for the focusing electrode 8 to establish its direct current potential. The electrode 8 is connected through a single-pole single-throw switch 26, which shunts a resistance 12 to a variable tap 13 on a resistance 14 shunting a source 15 of direct current potential.

In accordance with the invention, the electrode 8 is also connected to the source 16 whose voltage periodically varies in amplitude at a slow rate. The source 16 comprises a first capacitor 17, a gaseous discharge device 18 shunting this capacitor, and a source of direct current potential 19 having its negative terminal connected to the common negative terminals of the gaseous discharge device 18 and the capacitor 17, and having its positive terminal connected through a single pole single throw switch 20 and a resistance 21 to the common positive terminals of the gaseous discharge device 18 and capacitor 17. A second capacitor 22 is provided, shunted by the resistance 24, and having its negative terminal connected to the negative terminal of the source 19. The positive terminal of the capacitor 22 is connected to the cathode of a rectifier 23. The anode of rectifier 23 is connected to the terminal of the resistance 21 remote from the switch 20. The output of the source 16 appears across the resistance 24, whose negative terminal is connected to the cathode 6 of the camera tube, and whose positive terminal is connected through a coupling capacitor 25 to the electrode 8. The single-pole-single-throw switch 26 which is provided shunting the resistance 12, is mechanically linked to the switch 20 so that opening of the switch 26 is accompanied by closing of the switch 20 and closing of the switch 26 is accompanied by opening of the switch 20.

Source 16 functions to develop a varying voltage for application to the electrode 8 in the following manner. Closure of the switch 20 energizes the charging circuit of capacitor 17, causing a current flow through the resistance 21 which gradually charges the capacitor 17 up to the potential at which the gaseous discharge device 18, shunting it, conducts. When this potential is reached, and conduction of gaseous discharge device 18 occurs, the capacitor 17 is rapidly discharged to a voltage low enough to extinguish the device 18, thereby permitting the renewal of charging a capacitor 17 through resistance 21 by source 19. In this manner, a recurrent wave of generally sawtooth shape is developed across the capacitor 17. During part of the charging cycle of capacitor 17, the capacitor 22 is also charged through the diode 23. At the moment that the gaseous discharge 18 conducts, the potential across the capacitor 17 begins to drop rapidly, thereby reducing the potential of the anode of the rectifier 23 below the potential of its cathode. Nonconduction in the rectifier 23 terminates the charging cycle of the capacitor 22, and the capacitor 22 commences to discharge through the resistance 24. The alternate charging and discharging of capacitor 22 develops a voltage of triangular wave shape across the capacitor 22 and the output resistance 24 shunting it, and this triangular wave is repeated with the recurrent charging and discharging of capacitor 17.

The alignment procedure of the electron beam may now be considered. A first step in the alignment procedure is to adjust the potential on electrode 8 to achieve optimum focus. This is done with the switch 20 in open position and the switch 26 in closed position so as to apply directly the voltage appearing on the tap 13 to the focusing electrode 8. Variation in the position of tap 13 will thereupon bring about the adjustment of the focus of the electron beam upon the target to optimum value.

After focusing is achieved, the switch 26 is thrown to open position while switch 20 is now closed. The opening of switch 20 has little effect on the average potential of the electrode 8, since the leakage current through resistance 12 is small and produces only a negligible voltage drop. The resistance serves to isolate the two voltage supplies so as to permit modification of the instantaneous voltage on the focusing electrode under the influence of the source 16, which is now connected to supply a slowly varying potential to the electrode 8. If now the camera tube is monitored while one adjusts the alignment controls 9 and 11, the condition of alignment of the electron beam will be readily apparent. In a typical tube, there are always a few spots on the monitor caused by defects in the target 5 of a relatively permanent nature. When these spots are now observed light being blocked off from the camera tube, assuming that the alignment controls are not yet in proper setting, the spots will tend to gyrate in a reciprocating curve. Points on a test pattern would show a similar effect. As the alignment controls reach optimum position, the spots no longer gyrate, but they now remain stationary and change only in definition or focus. This condition indicates that the electron beam has entered the focusing field of the focusing coil 2 in substantially perfect alignment and has no substantial velocity component at right angles to the focusing flux such as would cause the electrons to travel in helical paths. When the electron beam is so aligned, the source 16 is disabled by the opening of switch 20 and the electrode 8 is directly connected to the tap 13 by the simultaneous closing of switch 26. This completes the alignment procedure.

While the preferred waveshape applied is triangular, to permit gradual sweeping of the focus in each direction, and of a period on the order of a second i. e. from one-half to two seconds, a sawtooth waveshape may also be employed. Figure 2 illustrates a generator 16′ which may be substituted for the generator 16. Elements in Figure 2 corresponding to similar elements in Figure 1 bear similar reference characters, and operate in a similar manner to generate a sawtooth wave. Either of these generators is of low cost and is capable of producing a gradually varying wave of relatively low frequency.

While a particular embodiment of this invention has been shown and described, it will, of course, be apparent that various modifications may be made without departing from the invention. Therefore, by the appended claims, it is intended to cover all such changes and modifications as fall within the true spirit and scope of the present invention.

What I claim as new and desire to secure by Letters Patent of the United States is:

1. In a television camera system having a camera tube of the type comprising a target electrode, an electron gun, and a focusing electrode, a focusing coil adapted to produce a magnetic field in a direction parallel to a line between the centers of said electron gun and said target electrode, an aligning coil adapted to produce a magnetic field perpendicular to said line, and energizing means for supplying direct current to said aligning coil, the combination comprising means for adjusting the orientation of said aligning coil, means for controlling the amount of current supplied to said aligning coil, a source of energizing potentials for said focusing electrode including means for producing a slowly varying periodic voltage, and switching means for selectively applying said periodic voltage to said focusing electrode during adjustment of said adjusting means and said controlling means.

2. The combination set forth in claim 1 wherein said means for producing a periodic voltage comprises a capacitor, means for recurrently charging said capacitor, and means for recurrently discharging said capacitor so as to produce across the terminals of said capacitor a periodically varying voltage.

3. The combination set forth in claim 1 wherein said means for producing a periodic voltage produces a periodic voltage having a period on the order of one second.

4. The combination set forth in claim 1 wherein said means for producing a periodic voltage produces a periodic voltage of triangular shape, the slopes of both portions of the periodic voltage being of substantially equal magnitude.

5. The combination set forth in claim 1 wherein said means for producing a periodic voltage comprises a first capacitor, means connected to said capacitor for gradually charging said capacitor to a positive potential, a gaseous discharge device shunting said capacitor and adapted to discharge said capacitor substantially instantaneously when the potential across said capacitor exceeds a predetermined potential, a second capacitor having one terminal connected to one terminal of said first capacitor, a direct current rectifier having its positive terminal connected to the other terminal, said first capacitor and its negative terminal connected to the other terminal said second capacitor so as to permit charging of said second capacitor by said charging means when the potential of said first capacitor exceeds the potential of said second capacitor, and a second resistance shunting said second capacitor for the gradual discharge thereof, whereby a periodic voltage of triangular shape is developed across the terminals of said second capacitor.

6. In a television camera system having a camera tube of the type comprising a target electrode, an electron gun adapted to project an electron beam toward said target electrode, and a focusing electrode, a focusing coil adapted to produce a magnetic field in a direction parallel to a line between the centers of said electron gun and said target electrode, beam aligning means adapted to deflect said electron beam in a direction transverse to said line, and a source of electrical energy coupled to said beam aligning means, the combination comprising means for adjusting the orientation of said aligning means, means for controlling the amount of energization of said aligning means, a source of energizing potentials for said focusing electrode including means for producing a slowly varying periodic voltage, and switching means for selectively applying said periodic voltage to said focusing electrode during adjustment of said adjusting means and said controlling means.

References Cited in the file of this patent

UNITED STATES PATENTS

| | | |
|---|---|---|
| 2,443,025 | De Tar | June 8, 1948 |
| 2,454,378 | Forgue | Nov. 23, 1948 |
| 2,459,602 | Ulman | Jan. 18, 1949 |
| 2,459,778 | Larson | Jan. 18, 1949 |